United States Patent
Kang et al.

(10) Patent No.: US 11,042,063 B2
(45) Date of Patent: Jun. 22, 2021

(54) DISPLAY DEVICE

(71) Applicant: SAMSUNG ELECTRONICS CO., LTD., Suwon-si (KR)

(72) Inventors: Sei Young Kang, Suwon-si (KR); Seung Jun Jeong, Suwon-si (KR); Min Woo Kang, Suwon-si (KR); Nam Seok Roh, Suwon-si (KR); Kwan Sik Min, Suwon-si (KR); Young Chol Lee, Suwon-si (KR); Jae Jeong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/721,223

(22) Filed: Dec. 19, 2019

(65) Prior Publication Data
US 2020/0201119 A1    Jun. 25, 2020

Related U.S. Application Data

(60) Provisional application No. 62/782,499, filed on Dec. 20, 2018.

(30) Foreign Application Priority Data

Apr. 3, 2019    (KR) .................. 10-2019-0038831

(51) Int. Cl.
*G02F 1/13357* (2006.01)
*G02F 1/1335* (2006.01)
*F21V 8/00* (2006.01)

(52) U.S. Cl.
CPC .. *G02F 1/133606* (2013.01); *G02F 1/133605* (2013.01); *G02B 6/0053* (2013.01); *G02F 1/133607* (2021.01)

(58) Field of Classification Search
CPC ... G02B 5/04; G02B 6/0053; G02F 1/133536; G02F 1/133605; G02F 1/133606; G02F 2001/133607
See application file for complete search history.

(56) References Cited

U.S. PATENT DOCUMENTS 7,125,131 B2    10/2006    Olczak
8,294,847 B2    10/2012    Yamagishi et al.
(Continued)

FOREIGN PATENT DOCUMENTS

JP    2007-206569 A    8/2007
KR    10-0660706 B1    12/2006
(Continued)

OTHER PUBLICATIONS

International Search Report (PCT/ISA/210) dated Apr. 13, 2020 issued by the International Searching Authority in International Application No. PCT/KR2019/017636.

*Primary Examiner* — Zheng Song
(74) *Attorney, Agent, or Firm* — Sughrue Mion, PLLC

(57) ABSTRACT

A display device includes a backlight unit configured to emit light, a display panel disposed in front of the backlight unit, and an optical sheet disposed between the backlight unit and the display panel. The optical sheet may include a first prism sheet including a plurality of first prisms arranged in a first direction, a second prism sheet including a plurality of second prisms arranged in a second direction intersecting the first direction, and disposed in front of the first prism sheet; and a third prism sheet including a plurality of third prisms arranged in the first direction, and disposed in front of the second prism sheet.

11 Claims, 15 Drawing Sheets

(56) References Cited

U.S. PATENT DOCUMENTS

| | | | |
|---|---|---|---|
| 2004/0263061 A1* | 12/2004 | Ishikawa | H01L 51/5275 313/501 |
| 2008/0019146 A1* | 1/2008 | Wang | G02B 6/0053 362/606 |
| 2008/0043172 A1 | 2/2008 | Kim et al. | |
| 2008/0094552 A1* | 4/2008 | Kim | G02B 6/0038 349/113 |
| 2009/0154157 A1* | 6/2009 | Sah | G02B 5/045 362/235 |
| 2009/0196035 A1* | 8/2009 | Cheng | G02B 5/0215 362/246 |
| 2011/0141765 A1* | 6/2011 | Chang | G02B 5/045 362/606 |
| 2014/0139777 A1* | 5/2014 | Zhao | G02B 6/0053 349/57 |
| 2014/0185273 A1* | 7/2014 | Tsai | G02B 5/045 362/97.1 |
| 2015/0301264 A1* | 10/2015 | Min | G02B 6/0036 362/343 |
| 2016/0341882 A1 | 11/2016 | Cho et al. | |
| 2017/0315403 A1* | 11/2017 | Kashiwagi | G02B 6/0055 |
| 2018/0292598 A1* | 10/2018 | Ke | G02B 6/0036 |
| 2019/0377228 A1* | 12/2019 | Saitoh | G02B 5/18 |
| 2020/0081298 A1* | 3/2020 | Liao | G09G 3/36 |

FOREIGN PATENT DOCUMENTS

| | | |
|---|---|---|
| KR | 10-2007-0045287 A | 5/2007 |
| KR | 10-2008-0035320 A | 4/2008 |
| KR | 10-1255296 B1 | 4/2013 |
| KR | 10-1268080 B1 | 5/2013 |
| KR | 10-2015-0083699 A | 7/2015 |
| KR | 10-1597014 B1 | 2/2016 |

\* cited by examiner $30° < alpha1~4 < 40°$ $30° < $ alpha $ < 40°$ $30° < \text{alpha} < 40°$ $30° < alpha < 40°$ $30° < alpha < 40°$

DISPLAY DEVICE

CROSS-REFERENCE TO RELATED APPLICATION(S)

This application is based on and claims priority under 35 U.S.C. § 119 to U.S. Provisional Application No. 62/782,499 filed on Dec. 20, 2018 in the U.S. Patent and Trademark Office, and Korean Patent Application No. 10-2019-0038831 filed on Apr. 3, 2019 in the Korean Intellectual Property Office, the disclosure of which are incorporated by reference herein in their entireties.

BACKGROUND

1. Field

The disclosure relates to a display device, and more specifically, to a display device having an optical sheet.

2. Description of the Related Art

A display device is an output device for visually presenting data information, such as texts, figures, and images.

The display device may include an emissive display panel, such as an organic light-emitting diode (OLED) display panel or a non-emissive display panel, such as a liquid crystal display (LCD) panel.

A display device having a LCD panel may include a backlight unit for supplying light to a display panel, and an optical sheet for increasing frontal brightness of light supplied from the backlight unit to the display panel.

The optical sheet may include a prism sheet to improve the distribution of the light supplied from the backlight unit. The prism sheet may increase the frontal brightness of the display device by refracting light, but also may cause side light leakage.

SUMMARY

Provided is a display device in which the side light leakage is reduced by improving the structure of the optical sheet.

According to an embodiment, there is provided is a display device that may include a backlight unit configured to emit light; a display panel disposed in front of the backlight unit; and an optical sheet disposed between the backlight unit and the display panel. The optical sheet may include a first prism sheet including a plurality of first prisms arranged in a first direction; a second prism sheet including a plurality of second prisms arranged in a second direction intersecting the first direction, and disposed in front of the first prism sheet; and a third prism sheet including a plurality of third prisms arranged in the first direction, and disposed in front of the second prism sheet.

The optical sheet may further include the first prism, the second prism, and the third prism that have cross sections in a form of an isosceles triangle.

The cross sections of the first prism and the second prism may include a base angle of 45 degrees and a vertex angle of 90 degrees.

The cross section of the third prism may include a base angle of $\alpha$ degrees and a vertex angle of $\beta$ degrees.

The base angle $\alpha$ may be in a range of 30 degrees to 40 degrees.

The optical sheet may further include a reflective polarizing sheet disposed between the second prism sheet and the third prism sheet.

The optical sheet may further include a reflective polarizing sheet disposed in front of the third prism sheet.

The first direction may be parallel to at least one of a traverse direction and a longitudinal direction of the display device.

The cross sections of the first prism and the third prism may include a base angle of 45 degrees and a vertex angle of 90 degrees.

The cross section of the second prism may include a base angle of $\alpha$ degrees and a vertex angle of $\beta$ degrees.

The base angle $\alpha$ may be in a range of 30 degrees to 40 degrees.

The optical sheet may further include a reflective polarizing sheet disposed between the second prism sheet and the third prism sheet.

The optical sheet may further include a reflective polarizing sheet disposed in front of the third prism sheet.

The first direction may be parallel to at least one of a traverse direction and a longitudinal direction of the display device.

According to another embodiment, there is provided a display device including a display panel; and an optical sheet disposed behind the display panel. The optical sheet may include a first prism sheet including a plurality of first prisms extending in a longitudinal direction of the display panel and arranged in a traverse direction of the display panel; a second prism sheet including a plurality of second prisms extending in the traverse direction and arranged in the longitudinal direction, and disposed in front of the first prism sheet; and a third prism sheet including a plurality of third prisms extending in the longitudinal direction and arranged in the traverse direction, and disposed in front of the second prism sheet.

The first prism and the second prism may have cross sections in a form of an isosceles triangle having a base angle of 45 degrees and a vertex angle of 90 degrees.

The third prism may have a cross section in a form of an isosceles triangle having a base angle of $\alpha$ degrees and a vertex angle of $\beta$ degrees.

The base angle $\alpha$ may be in a range of 30 degrees to 40 degrees.

The optical sheet may further include a reflective polarizing sheet disposed between the second prism sheet and the third prism sheet.

According to another embodiment, there is provided a display device including a display panel and an optical sheet disposed behind the display panel. The optical sheet may include a first prism sheet including a plurality of first prisms extending in a traverse direction of the display panel and arranged in a longitudinal direction of the display panel; a second prism sheet including a plurality of second prisms extending in the longitudinal direction and arranged in the traverse direction, and disposed in front of the first prism sheet; and a third prism sheet including a plurality of third prisms extending in the traverse direction and arranged in the longitudinal direction, and disposed in front of the second prism sheet.

BRIEF DESCRIPTION OF THE DRAWINGS

The above and other aspects, and features of certain embodiments of the disclosure will be more apparent from the following description taken in conjunction with the accompanying drawings.

DESCRIPTION

The disclosure will be described with reference to the accompanying drawings, for comprehensive understanding of the embodiments herein. It should be understood that the disclosure is not limited to the embodiments described herein, but may be implemented in various forms, and various modifications may be made to the embodiments.

Terms used herein are used to help understand the disclosure and are not intended to restrict and/or limit the scope and spirit of the disclosure. As used herein, the singular forms "a," "an" and "the" may include the plural forms as well, unless the context clearly indicates otherwise. It may be further understood that the terms "comprises," "comprising," "includes" and/or "including," when used herein, may specify the presence of stated features, integers, steps, operations, elements, and/or components, but do not preclude the presence or addition of one or more other features, integers, steps, operations, elements, components, and/or groups thereof.

It should be understood that, although the terms "first," "second," etc. may be used to describe various elements, these elements are not limited by these terms. These terms may be used to distinguish one element from another. For example, a first element may be termed a second element, and, similarly, a second element may also be termed a first element, without departing from the scope of the disclosure.

In the following description, a display device including an edge type backlight unit is described as an example, but the disclosure is not limited thereto. An optical sheet according to the concept of the disclosure may be applied to a display device including a direct type backlight unit.

Figure 1:
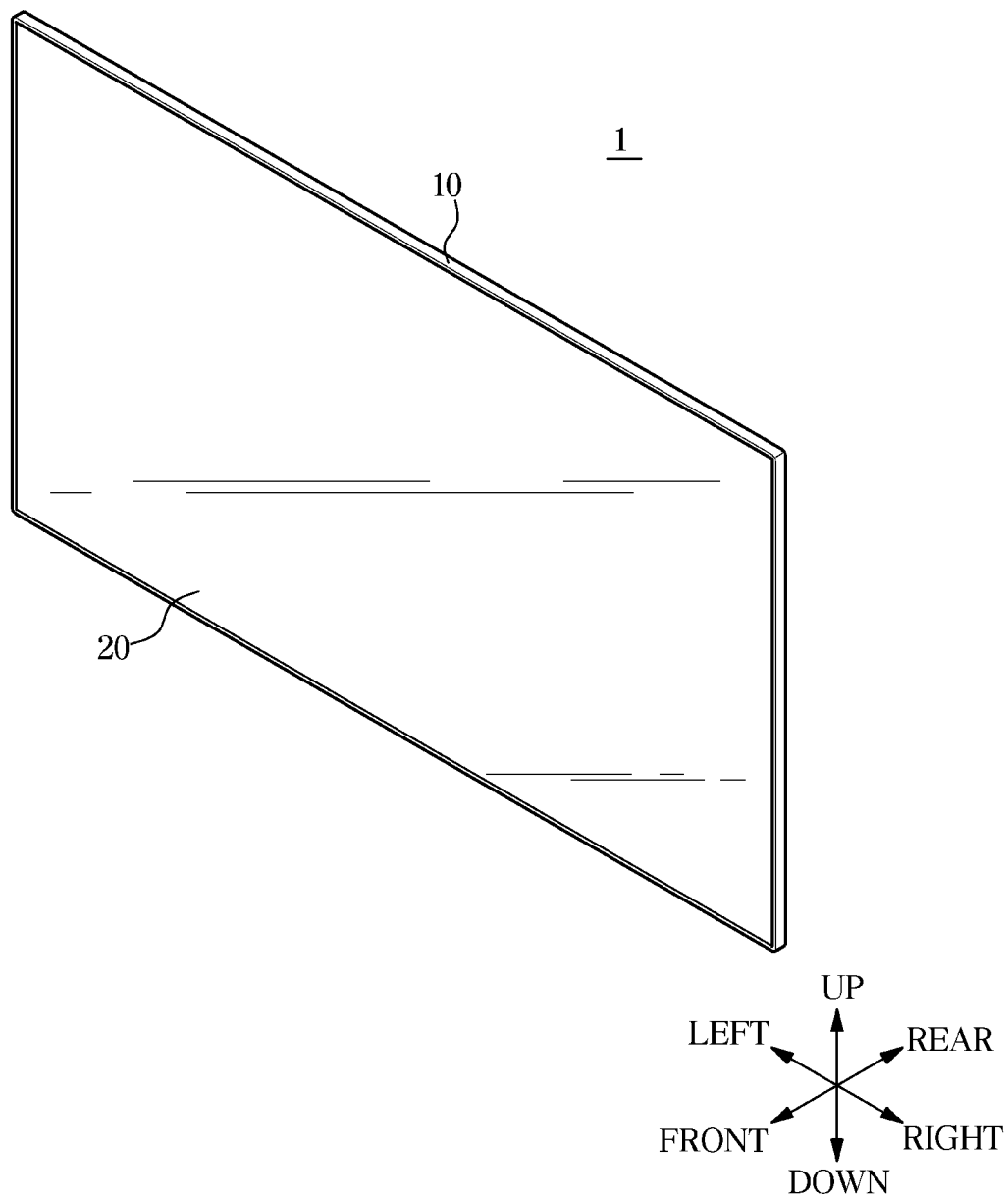
FIG. 1 is a view illustrating a display device according to an embodiment.
Figure 2:
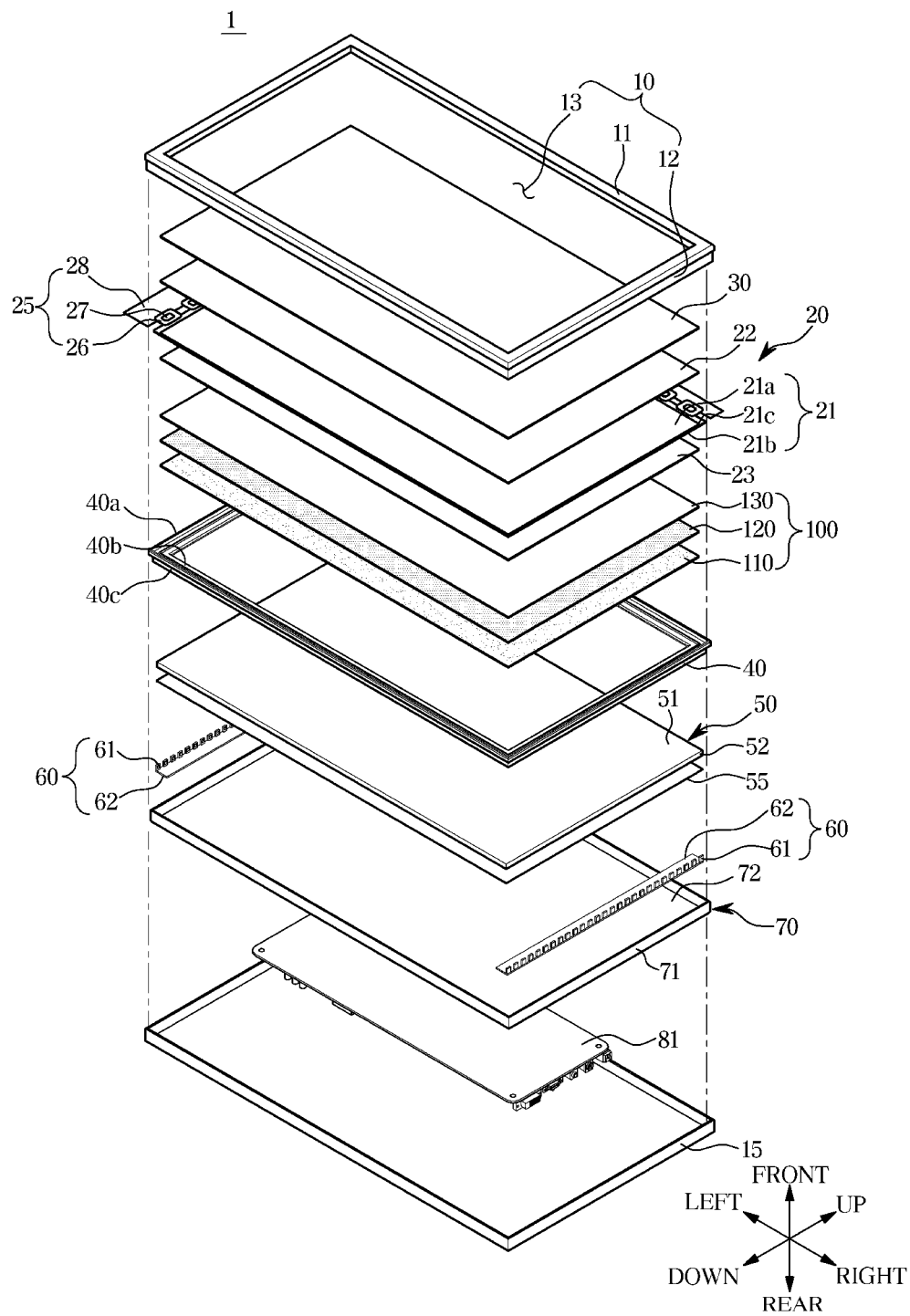
FIG. 2 is an exploded view illustrating a display device according to an embodiment.

FIG. 1 is a view illustrating a display device according to an embodiment. FIG. 2 is an exploded view illustrating the display device shown in FIG. 1.

Referring to FIGS. 1 and 2, a display device 1 may include a top chassis 10, a display panel 20, a backlight unit 60, and a bottom chassis 70. The top chassis 10 may be disposed in front of the display panel 20. The display panel 20 may be disposed in front of the backlight unit 60. The backlight unit 60 may be disposed behind the display panel 20 and are spaced apart from each other. The bottom chassis 70 may be disposed behind the display panel 20 and the backlight unit 60.

A middle mold 40 may be further provided between the display panel 20 and the backlight unit 60. The middle mold 40 may support the display panel 20 so that the display panel 20 may be spaced apart from the backlight unit 60. A controller that may control the driving of the display device 1 and may be positioned behind the bottom chassis 70. A rear cover 15 may be disposed behind the controller to provide an external appearance of the rear side of the display device 1.

A plurality of optical sheets 100 may be provided behind the display panel 20. A light guide plate 50 may be positioned behind the optical sheets 100. A reflective sheet 55 may be disposed behind the light guide plate 50.

The light guide plate 50 may allow light emitted from a light emitting diode 61 to be uniformly supplied to the optical sheet 100. The light guide plate 50 may include an exit surface 51 and an incident surface 52. The exit surface 51 may be positioned behind the optical sheet 100 to face one surface of the optical sheet 100. The incident surface 52 may be provided at a side end surface of the light guide plate 50 such that light emitted from the light emitting diode 61 is incident to the light guide plate 50.

The reflective sheet 55 may be disposed behind the light guide plate 50. Light emitted through a lower surface of the light guide plate 50 may be guided back to the light guide plate 50 by the reflective sheet 55.

The backlight unit 60 may include a plurality of the light emitting diodes 61 and a printed circuit board 62. The backlight unit 60 may be provided to emit light. The light emitting diode 61 may supply light to the light guide plate 50. The plurality of light emitting diodes 61 may be mounted on the printed circuit board 62.

The plurality of light emitting diodes 61 may be mounted to protrude on one surface of the printed circuit board 62. The plurality of light emitting diodes 61 may be disposed on the one surface of the printed circuit board 62 at predetermined intervals.

The printed circuit board 62 may be positioned behind the reflective sheet 55. The printed circuit board 62 may be fixed to the bottom chassis 70 through a fastening member, such as a screw or an adhesive member such as a double-sided tape. On the other surface of the printed circuit board 62, which may be opposite to the one surface where the plurality of light emitting diodes 61 are mounted, may be fixed to a bottom surface 72 of the bottom chassis 70.

Although not shown in the drawings, the display device may include a quantum dot sheet disposed in front of the light guide plate 50.

The quantum dot sheet may convert the light emitted from the exit surface 51 of the light guide plate 50 into white light. According to an embodiment, the quantum dot sheet may include a fluorescent member including a quantum dot, and a barrier film that blocks the quantum dot from being exposed to oxygen or moisture.

Once voltage is applied, the quantum dot emits light itself, or absorbs light to emit light of a specific wavelength. A smaller quantum dot emits light of a shorter wavelength, and a larger quantum dot emits light of a longer wavelength. By using various sized quantum dots, light of varying wavelengths from red light to blue light may be emitted. In other words, by using the quantum dots having various sizes, light having a natural color (white light) may be output.

The display panel 20 may include a first substrate 21b provided with a thin film transistor (TFT) and a pixel electrode, and a second substrate 21a disposed at one side of the first substrate 21b and provided with a color filter and a driving source. A liquid crystal layer 21c may be provided between the first substrate 21b and the second substrate 21a. Polarizing sheets 22 and 23 may be attached to the rear of the first substrate 21b and/or the front of the second substrate 21a. A module combining the first substrate 21b, the second substrate 21a, and the liquid crystal layer 21c may be referred to as a liquid crystal display module 21.

The first substrate 21b may be provided at one side with a driver 25 for applying a driving signal. The driver 25 may include a flexible printed circuit board 26, a driving chip 27, and a circuit board 28. The driving chip 27 may be mounted on one side of the flexible printed circuit board 26. The circuit board 28 may be connected to the other side of the flexible printed circuit board 26.

A black matrix may be formed on the second substrate 21a. A cable to which the driver 25 and the controller are connected may pass through a space behind the black matrix.

The display panel 20 may form a screen by adjusting the arrangement of the liquid crystal layer 21c. The display panel 20 is a non-emissive device, and thus may display an image by receiving light from the backlight unit 60

In front of the display panel 20, an optical film 30 may be disposed to improve a viewing angle and/or contrast ratio. The optical film 30 may include a diffusion layer that diffuses light incident on the display panel 20.

The top chassis 10 may include a bezel 11 and a top side surface 12. The bezel 11 may surround a front edge of the display panel 20. The top side surface 12 may be provided bent downward from the end of the bezel 11. At least a portion of the top side surface 12 may be in contact with the bottom chassis 70. For example, at least a portion of the top side surface 12 may cover the outer surface of a bottom side surface 71.

The top chassis 10 may be provided with an opening 13 to expose the display panel 20. Through the opening 13, an effective display area in which a screen is actually displayed on the display panel 20 may be exposed to the front.

The bottom chassis 70 may include a bottom side surface 71 and a bottom surface 72. The bottom side surface 71 may protrude upward along a circumference of the bottom surface 72. The backlight unit 60 may be mounted on the bottom surface 72. A heat dissipation sheet may be disposed behind the bottom surface 72 of the bottom chassis 70.

The middle mold 40 may include a first support portion 40a, a second support portion 40b, and an extension portion 40c. The first support portion 40a and the second support portion 40b may extend inward from the sides of the middle mold 40. Further, the second support portion 40b may extend inward from the first support portion 40a and extend downward from the first support portion 40a to form a step. The extension part 40c may extend downward from the middle mold 40. A portion of the display panel 20 may be supported by the first support portion 40a. A portion of the optical film 30 may be supported by the second support portion 40b. The outer surface of the extension portion 40c may make contact with the inner surface of the bottom chassis 70.

The light emitting diode 61 may emit light and heat at the same time. The printed circuit board 62 may not only serve to supply a driving signal to the light emitting diode 61, but may also serve to transfer heat generated from the light emitting diodes 61 to the outside. That is, heat generated from the light emitting diode 61 may be transferred to the bottom chassis 70 through the printed circuit board 62. In order to increase heat transfer efficiency, the printed circuit board 62 may be formed of a metal having high thermal conductivity. For example, the printed circuit board 62 may be formed of a metal material including aluminum, copper, and the like.

The controller may be mounted behind the bottom chassis 70. A rear cover 15 may be positioned behind the controller. The controller may include a substrate 81 and a plurality of electronic components mounted on the substrate 81. Electronic components may be installed on the top and/or bottom of the substrate 81. The plurality of electronic components may be mounted on the substrate 81 or may be fixed by a clamp.

Figure 3:
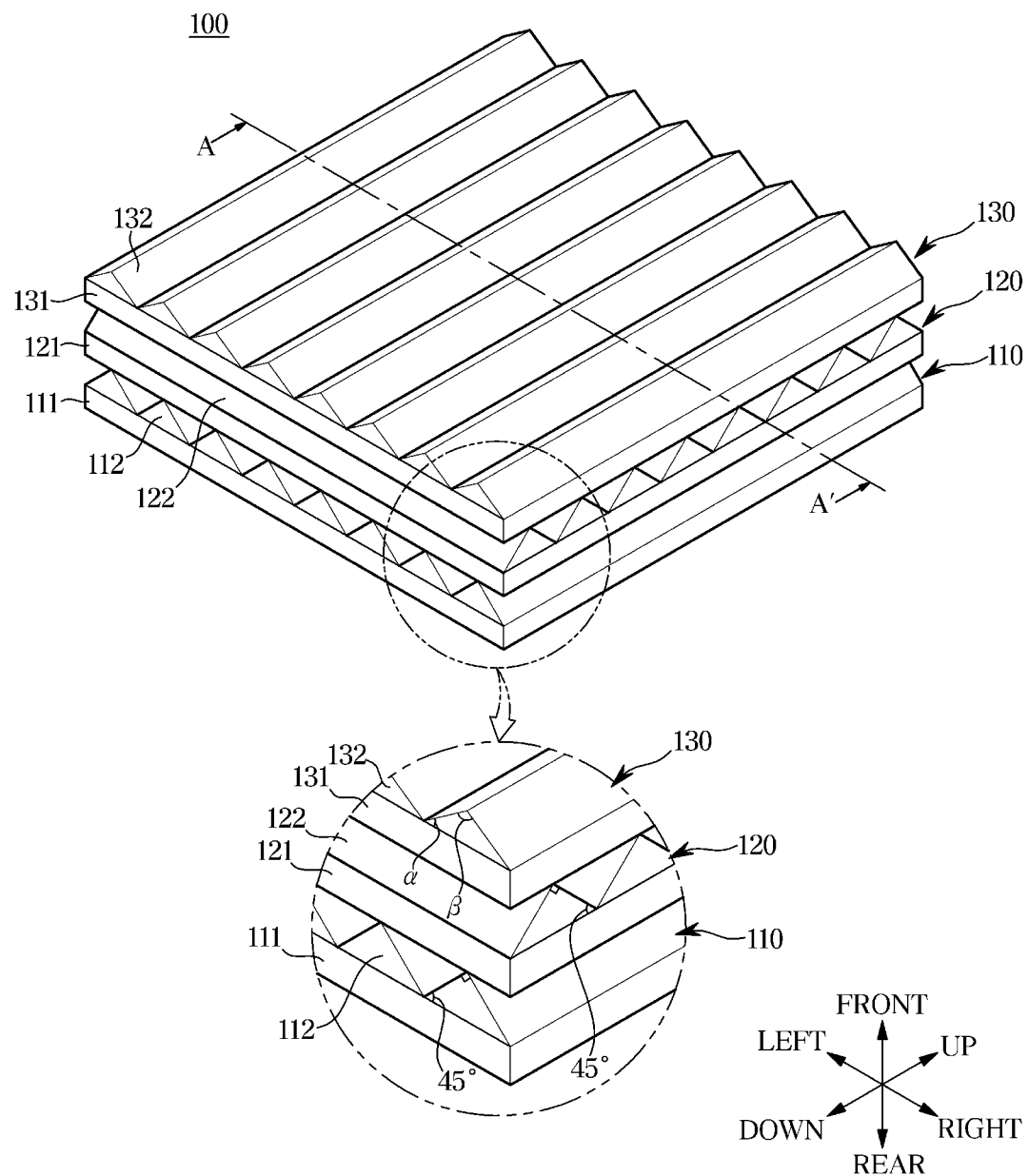
FIG. 3 is an enlarged perspective view illustrating an optical sheet according to an embodiment.
Figure 4:
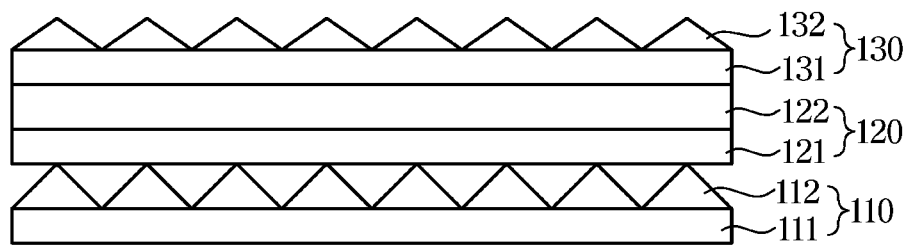
FIG. 4 is a schematic cross-sectional view illustrating an optical sheet according to an embodiment.

FIG. 3 is an enlarged perspective view illustrating an optical sheet shown in FIG. 2. FIG. 4 is a schematic cross-sectional view illustrating the optical sheet shown in FIG. 3.

Referring to FIG. 3, the optical sheet 100 may include a first prism sheet 110, a second prism sheet 120, and a third prism sheet 130.

The first prism sheet 110 may be disposed in front of the light guide plate 50. The second prism sheet 120 may be disposed in front of the first prism sheet 110. The third prism sheet 130 may be disposed in front of the second prism sheet 120 and may be disposed behind the display panel 20.

The first prism sheet 110 may include a first substrate layer 111 and a first prism 112. The second prism sheet 120 may include a second substrate layer 121 and a second prism 122. The third prism sheet 130 may include a third substrate layer 131 and a third prism 132.

According to an embodiment, the first prism sheet 110 may include the first substrate layer 111 disposed to face the light guide plate 50 and a plurality of the first prisms 112 may be formed on an upper surface of the first substrate layer 111. Each of the plurality of first prisms 112 may extend in an upper side and lower side direction. The plurality of first prisms 112 may be repeatedly arranged in a left side and right side direction. The direction in which the first prisms 112 extend and the direction in which the first prisms 112 are arranged may cross each other.

The second prism sheet 120 may include the second surface layer 121 disposed to face the first prism sheet 110 while being disposed in front of the first prism sheet 110 and a plurality of the second prisms 122 formed on an upper surface of the second substrate layer 121. Each of the plurality of second prisms 122 may extend in the left side and right side direction. The plurality of second prisms 122 may be repeatedly arranged in the upper side and lower side direction. The direction in which the second prisms 122 extend and the direction in which the second prisms 122 are arranged may cross each other.

The third prism sheet 130 may include the third substrate layer 131 disposed to face the second prism sheet 120 while being disposed on the upper surface of the second prism sheet 120 and a plurality of the third prisms 132 formed on the upper surface of the third substrate layer 131. Each of the plurality of third prisms 132 may extend in the upper side and lower side direction. The plurality of third prisms 132 may be repeatedly arranged in the left side and right side direction. The direction in which the third prisms 132 extend and the direction in which the third prisms 132 are arranged may cross each other.

The arrangement structure of the prism sheets 110, 120, and 130 as described above will be referred to as "vertical horizontal vertical" (VHV).

In FIG. 3, the first prism sheet 110 and the second prism sheet 120 are illustrated as having the same structure and having stacking directions crossing each other, and the third prism sheet 130 and the second prism sheet 120 are illustrated as having different structures and having stacking directions crossing each other. On the other hand, the first prism sheet and the second prism sheet may be disposed such that the prisms of the first prism sheet cross the prisms of the second prism sheet at an angle equal to or greater than 45 degrees and less than 90 degrees, rather than crossing at an angle of 90 degrees. Similarly, the second prism sheet and the third prism sheet may be arranged at an angle equal to or greater than 45 degrees and less than 90 degrees.

Referring to FIGS. 3 and 4, the first prism 112 may have a cross section in the form of an isosceles triangle. The first prism 112 may have a cross section in the form of an isosceles triangle having a base angle of 45 degrees and a vertex angle of 90 degrees.

The second prism 122 may have a cross section in the form of an isosceles triangle. The second prism 122 may have a cross section in the form of an isosceles triangle having a base angle of 45 degrees and a vertex angle of 90 degrees.

The third prism 132 may have a cross section in the form of an isosceles triangle. The third prism 132 may have a cross section in the form of an isosceles triangle having a base angle of α degrees and a vertex angle of β degrees, different from the first and second prisms 112 and 122. That is, the third prism 132 may have a cross section in the form of an isosceles triangle having a base angle of α degrees and a vertex angle of β degrees. In this case, the base angle α may have the following range:

$$30° \le \alpha \le 40°$$

Referring to FIG. 4, the second prism sheet 120 may be stacked in front of the first prism sheet 110, and the third prism sheet 130 may be stacked in front of the second prism sheet 120. The first prism sheet 110, the second prism sheet 120, and the third prism sheet 130 may be provided as separate sheets, and may be stacked in a front side and rear side direction. Alternatively, the first prism sheet 110, the second prism sheet 120, and the third prism sheet 130 may be laminated into one sheet. Alternately, the first prism sheet 110 and the second prism sheet 120 maybe laminated into one sheet, or the second prism sheet 120 and the third prism sheet 130 may be laminated into one sheet.

Figure 5:
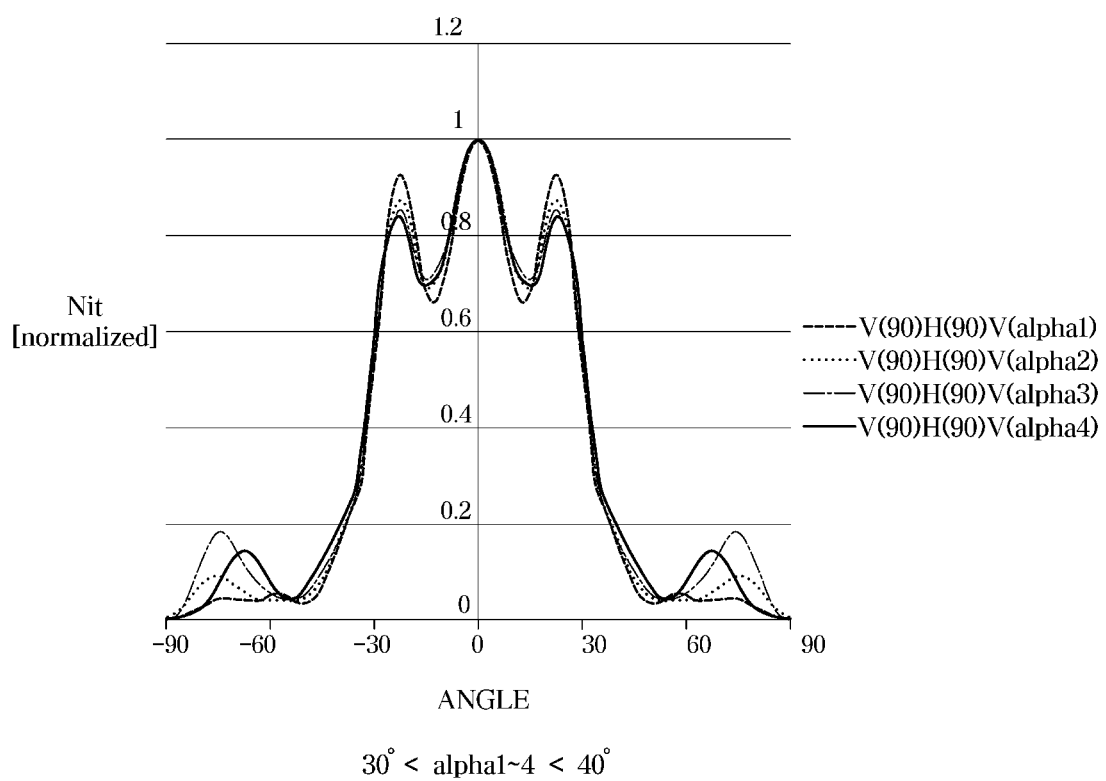
FIG. 5 is a graph showing distribution of light according to a viewing angle in a display device according to an embodiment.

According to an embodiment, at least one of the plurality of prism sheets may include prisms having different heights when laminated. At least one of the first prism sheet 110, the second prism sheet 120, and the third prism sheet 130 may include prisms having different heights. The prisms having different heights may represent a prism having a first height and a prism having a second height different from the first height. The prism having the first height and the prism having the second height may be alternately arranged along a traverse direction or a longitudinal direction of the display device. FIG. 5 is a graph showing distribution of light according to a viewing angle in the display device according to an embodiment. In FIG. 5, the vertical axis represents the brightness of light of the backlight unit that has passed through the optical sheet. In FIG. 5, the viewing angle in the left side and right side direction is illustrated. Accordingly, the angle of 0 degrees represents an angle when the user looks at the display device from the center of the display device.

FIG. 5 is a graph showing the distribution of light according to α1, α2, α3, and α4 satisfying 30° a 40° in the optical sheet 100 according to an embodiment. The angle of α decreases in the order of α1, α2, α3, and α4. Accordingly, the angle of α is the largest in the case of α1, and is the smallest in the case of α4.

Referring to FIG. 5, it may be understood that the distribution of light varies depending on the size of α. As the size of a changes, the light distribution slightly varies, and the brightness of the side light generated at a viewing angle of 30 degrees or more may be reduced. By reducing the brightness of the side light, the side light leakage of the display device may be reduced. The side light leakage of the display device may act as an obstacle to implementing the full black color. Accordingly, the black color implementation of the display device may be improved by reducing the side light leakage of the display device.

Accordingly, the display device may include a plurality of prism sheets as described above. While the light emitted from the backlight unit 60 is passing through the plurality of prism sheets, the transmission angle is narrowed. As the transmission angle of the light is narrowed, liquid crystal color reproducibility and image quality including black color may be improved. As described above, the optical film 30 disposed in front of the display panel 20 may have a diffusion layer. Since the light passing through the display panel 20 is diffused by the diffusion layer on the upper side of the display panel 20, the viewing angle may be secured. That is, the viewing angle of the display device may be widened.

As a result, the image quality may be improved at both sides of the display panel in the longitudinal direction. In this case, the longitudinal direction may refer to the left side and right side direction of the display panel.

Furthermore, the display device according to the disclosure may ensure improved image quality and a wide viewing angle.

Figure 6:
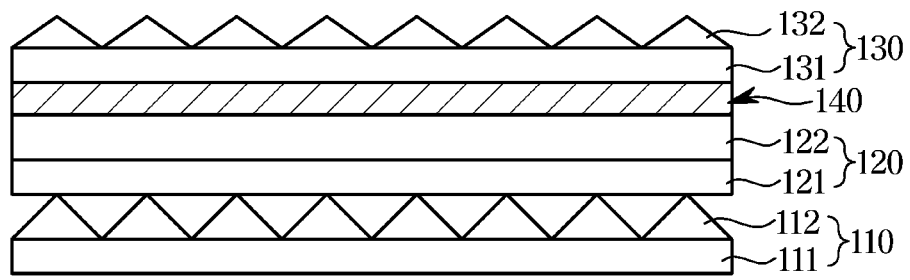
FIG. 6 is a schematic cross-sectional view illustrating an optical sheet according to another embodiment.
Figure 7:
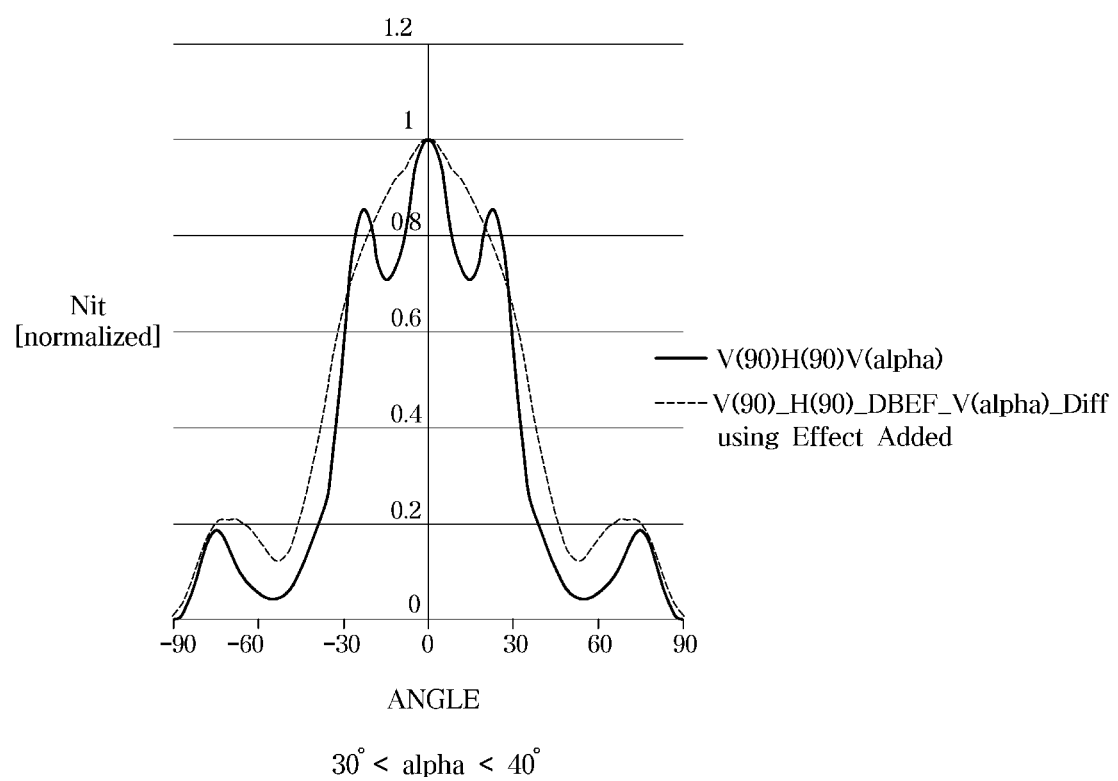
FIG. 7 is a graph illustrating distribution of light according to a viewing angle in a display device including the optical sheet shown in FIG. 6 according to an embodiment.

FIG. 6 is a schematic cross-sectional view illustrating an optical sheet of a display device according to another embodiment. FIG. 7 is a graph illustrating distribution of light according to a viewing angle in the display device including the optical sheet shown in FIG. 6.

Referring to FIG. 6, the optical sheet 100 may further include a reflective polarizing sheet 140 disposed between the second prism sheet 120 and the third prism sheet 130. The reflective polarizing sheet 140 may include a diffusion layer that diffuses light. Alternatively, the reflective polarizing sheet 140 may be disposed in front of the third prism sheet 130 to improve the brightness of the backlight unit 60.

The reflective polarizing sheet 140 may improve the brightness of the backlight unit 60. The reflective polarizing sheet 140 may be disposed between the second prism sheet 120 and the third prism sheet 130 to improve the brightness of the backlight unit 60.

The reflective polarizing sheet 140 may reflect light irradiated from the backlight unit 60, which may be polarized in a direction different from a polarization direction of the reflective polarizing sheet 140. The reflective polarization sheet 140 may have the same polarization direction as that of the reflective sheet 55 disposed behind the reflective polarization sheet 140.

The light reflected by the reflective polarizing sheet 140 may be recycled inside the display device to improve the brightness of the display device. Some of the lights reflected by the reflective polarizing sheet 140 may travel back to the light guide plate 50 or the reflective sheet 55. As the process is repeated, the polarization direction of the light may be changed. When the polarization direction of the light is parallel to the polarization direction of the reflective polarizing sheet 140, the light may pass through the reflective polarizing sheet 140.

As an example of the reflective polarizing sheet 140, a dual brightness enhancement film (DBEF) may be employed. As described above, the reflective polarizing sheet 140 may be disposed between the second prism sheet 120 and the third prism sheet 130 to improve the brightness of the backlight unit 60.

Although the reflective polarizing sheet 140 is illustrated as being stacked in front of the second prism sheet 120, and behind the third prism sheet 130, the reflective polarizing sheet 140 may be laminated with the second prism sheet 120 and/or the third prism sheet 130. Alternatively, the reflective polarizing sheet 140 may be laminated with the first prism sheet 110, the second prism sheet 120, and the third prism sheet 130.

Furthermore, at least one prism sheet in the lamination may include prisms having different heights. At least one of the first prism sheet 110, the second prism sheet 120, and the third prism sheet 130 may include prisms having different heights. The prisms having different heights may represent a prism having a first height and a prism having a second height different from the first height. The prism having the first height and the prism having the second height may be alternately arranged along the traverse direction or the longitudinal direction of the display device.

Referring to FIG. 7, it may be seen that the diffusion of light slightly varies between a case in which a diffusion effect is provided by at least one of the first, second, and third prism sheets 110, 120 and 130 or by another optical sheet (e.g., the reflective polarizing sheet) 140 and a case in which no diffusion effect is provided.

The brightness of the backlight unit 60 may gradually decrease at a viewing angle of less than about 30 degrees depending on the diffusion of an optical diffusion sheet. Referring to FIG. 7, when no diffusion effect is provided, the viewing angle-specific brightness graph has a section in which the inclination is 0, at a viewing angle of about 30 degrees or less. When no diffusion effect is provided, for example, when the reflective polarizing sheet 140 having a diffusion effect is not disposed, the viewing angle-specific brightness graph has a section in which the brightness abruptly decreases and then increases, at a viewing angle of about 30 degrees or less. However, when the reflective polarizing sheet 140 is disposed between the second prism sheet 120 and the third prism sheet 130 as shown in FIG. 6, the viewing angle-specific brightness graph does not have a section in which a sudden change occurs in the brightness.

As such, by including the reflective polarizing sheet 140 in the optical sheet 100, the brightness is prevented from being abruptly lowered at a viewing angle of about 30 degree or less, which is a range in which viewers generally view the display device. When a sudden change in brightness exists at a viewing angle of 30 degrees or less, the brightness of an image displayed on the display device may suddenly change depending on the viewing angle of the display device, thereby causing the viewer to feel uncomfortable. According to the embodiments described above, such a rapid change in brightness based on the viewing angle may be reduced. Accordingly, the display device may display an image of uniform brightness even when a user views the display device from various angles.

Figure 8:
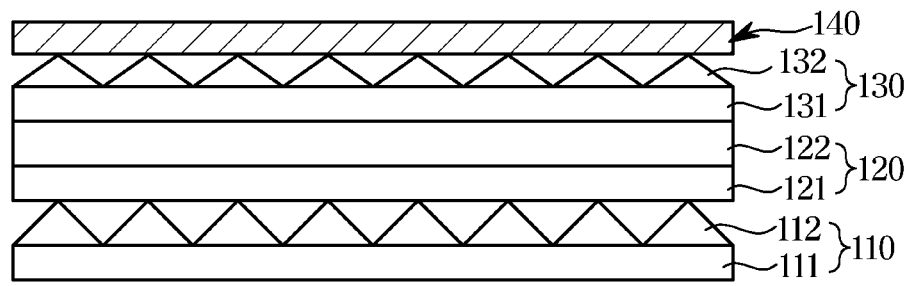
FIG. 8 is a schematic cross-sectional view illustrating an optical sheet of a display device according to another embodiment.
Figure 9:
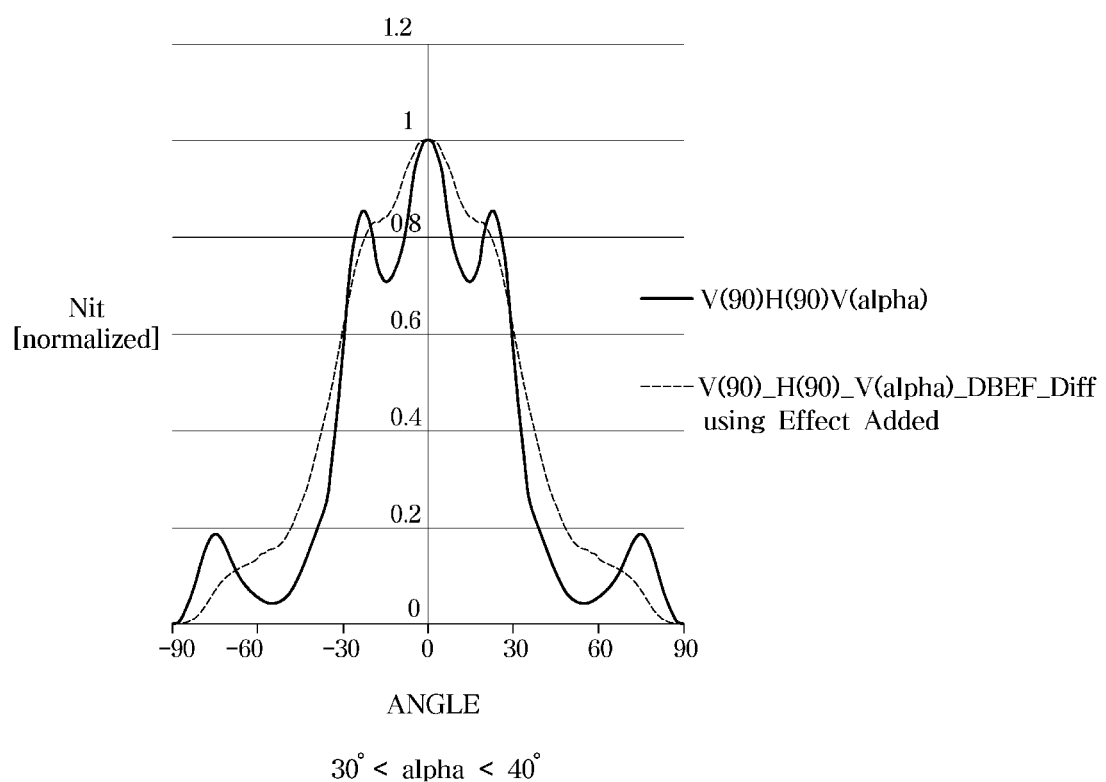
FIG. 9 is a graph illustrating distribution of light according to a viewing angle in a display device including the optical sheet shown in FIG. 8 according to an embodiment.

FIG. 8 is a schematic cross-sectional view illustrating an optical sheet of a display device according to another embodiment. FIG. 9 is a graph illustrating distribution of light according to a viewing angle in the display device including the optical sheet shown in FIG. 8.

Referring to FIG. 8, the optical sheet 100 may include a reflective polarizing sheet 140 (e.g., DBEF) disposed in front of the third prism sheet 130.

The reflective polarizing sheet 140 may improve the brightness of the backlight unit 60. The reflective polarizing sheet 140 may be disposed in front of the third prism sheet 130 to improve the brightness of the backlight unit 60.

The reflective polarizing sheet 140 may reflect light irradiated from the backlight unit 60, which may be polarized in a direction different from a polarization direction of the reflective polarizing sheet 140. The reflective polarization sheet 140 may have the same polarization direction as that of the reflective sheet 55 disposed behind the reflective polarization sheet 140.

The light reflected by the reflective polarizing sheet 40 may be recycled inside the display device to improve the brightness of the display device. Some of the lights reflected by the reflective polarizing sheet 140 may travel back to the light guide plate 50 or the reflective sheet 55. As the process is repeated, the polarization direction of the light may be changed. When the polarization direction of the light is parallel to the polarization direction of the reflective polarizing sheet 140, the light may pass through the reflective polarizing sheet 140.

As an example of the reflective polarizing sheet 140, a dual brightness enhancement film (DBEF) may be employed. As described above, the reflective polarizing sheet 140 may be disposed in front of the third prism sheet 130 to improve the brightness of the backlight unit 60.

Although the reflective polarizing sheet 140 is illustrated as being stacked in front of the third prism sheet 130, the reflective polarizing sheet 140 may be laminated with the third prism sheet 130. Alternatively, the reflective polarizing sheet 140 may be laminated with the first prism sheet 110, the second prism sheet 120, and the third prism sheet 130.

Furthermore, at least one prism sheet in the lamination may include prisms having different heights. At least one of the first prism sheet 110, the second prism sheet 120, and the third prism sheet 130 may include prisms having different heights. The prisms having different heights may represent a prism having a first height and a prism having a second height different from the first height. The prism having the first height and the prism having the second height may be alternately arranged along the traverse direction or the longitudinal direction of the display device.

Referring to FIG. 9, it may be seen that the diffusion of light slightly varies between a case in which a diffusion effect is provided by at least one of the first to third prism sheets 110 to 130 or by another optical sheet (e.g., the reflective polarizing sheet 140) and a case in which no diffusion effect is provided.

The brightness of the backlight unit 60 may gradually decrease at a viewing angle of less than about 30 degrees depending on the diffusion of an optical diffusion sheet. Referring to FIG. 9, when no diffusion effect is provided, the viewing angle-specific brightness graph has a section in which the inclination is 0, at a viewing angle of about 30 degrees or less. When no diffusion effect is provided, for example, when the reflective polarizing sheet 140 having a diffusion effect is not disposed, the viewing angle-specific brightness graph has a section in which the brightness abruptly decreases and then increases, at a viewing angle of about 30 degrees or less. However, when the reflective polarizing sheet 140 is disposed in front of the third prism sheet 130 as shown in FIG. 8, the viewing angle-specific brightness graph does not have a section in which a sudden change occurs in the brightness.

As such, by disposing the reflective polarizing sheet 140 in front of the third prism sheet 130, the brightness is prevented from being abruptly lowered at a viewing angle of about 30 degrees or less, which is generally a range of viewing angle in which users view the display device. When a sudden change in the brightness exists at a viewing angle of 30 degrees or less, the brightness of an image displayed on the display device may suddenly change depending on the viewing angle of the display device, thereby causing the viewer to feel uncomfortable. According to the embodiments described above, such a rapid change in the brightness by the viewing angle may be reduced. Accordingly, the display device may display an image of uniform brightness even when the viewing angle varies.

Figure 10:
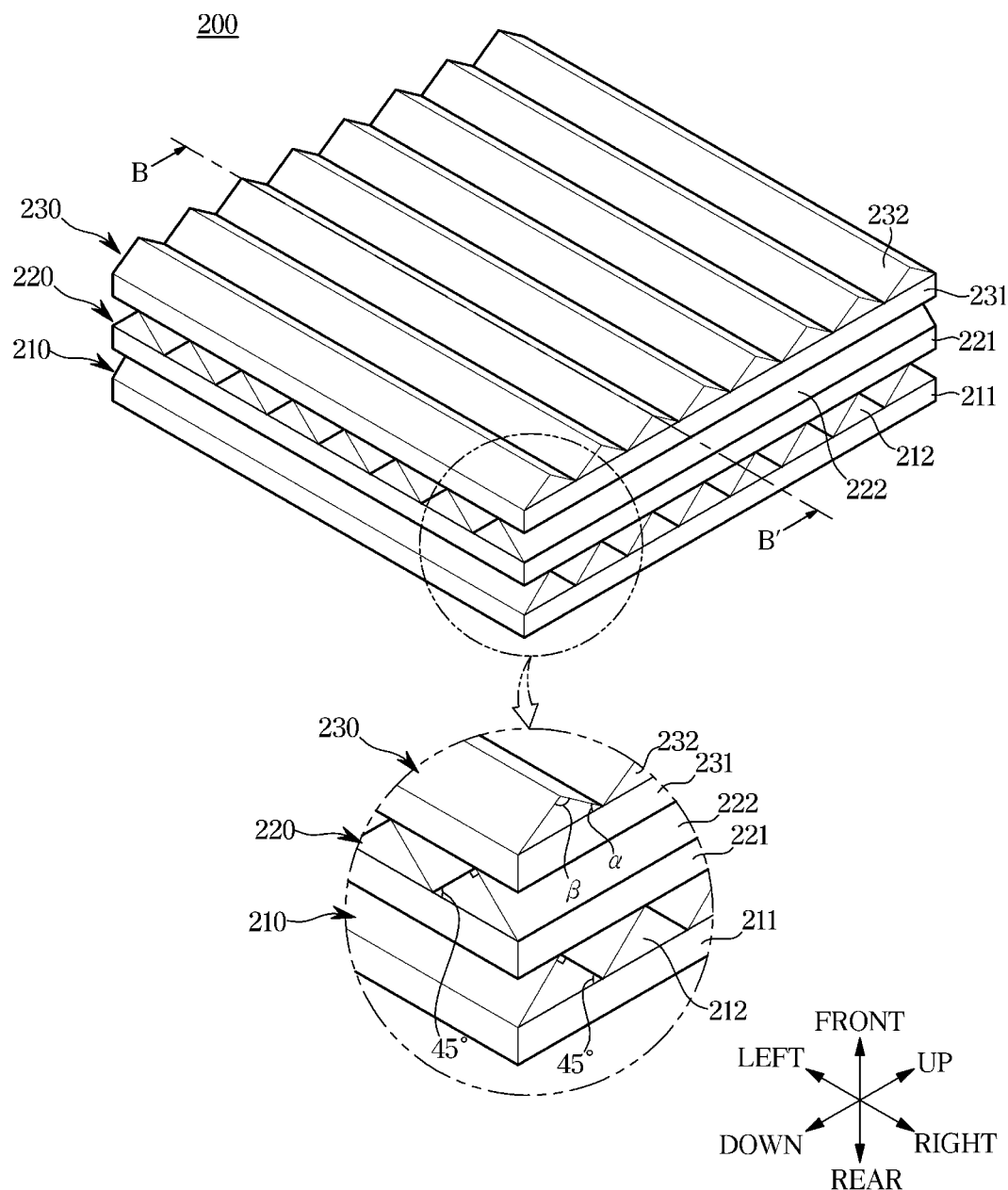
FIG. 10 is an enlarged perspective view illustrating an optical sheet of a display device according to another embodiment.
Figure 11:
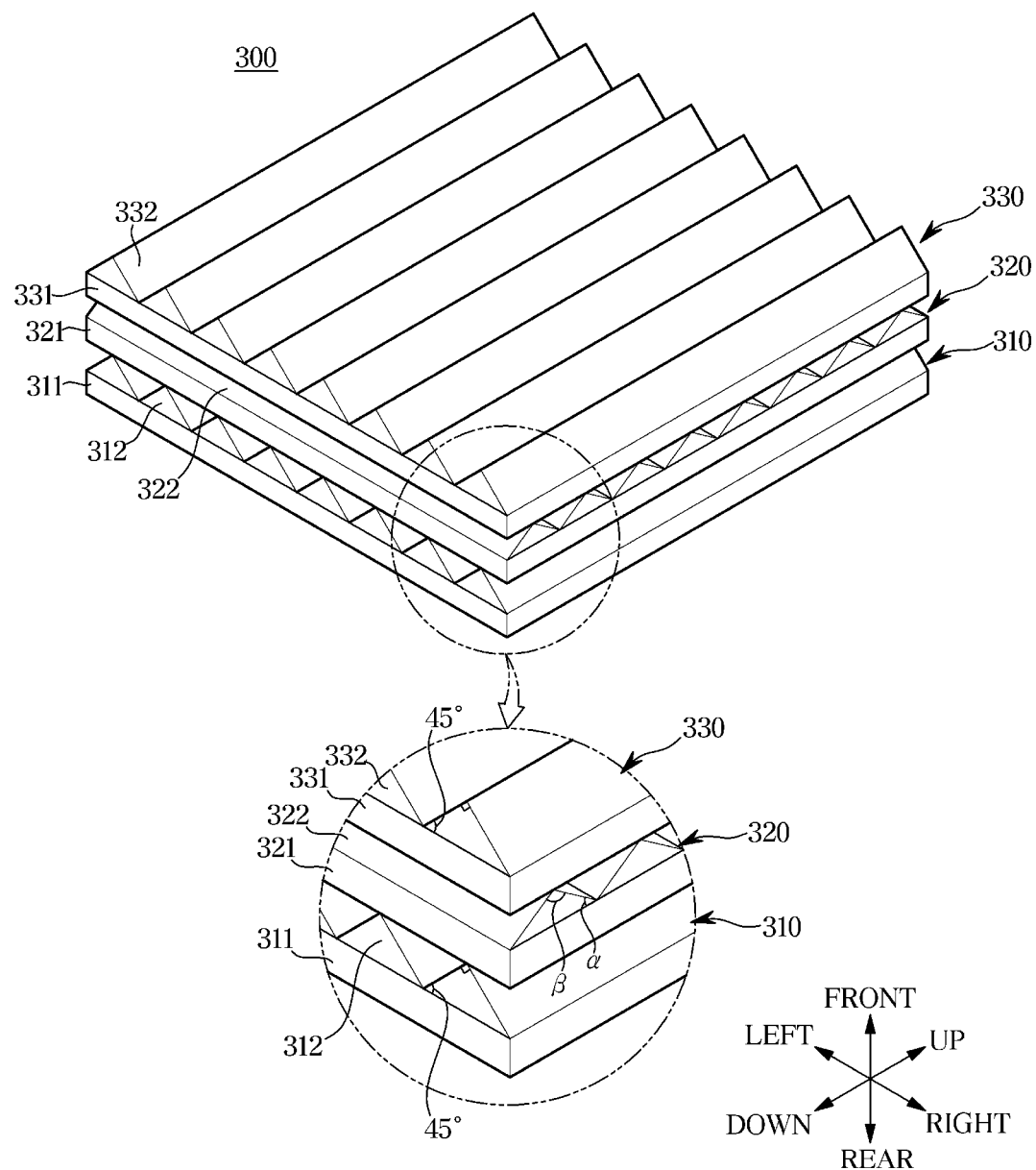
FIG. 11 is an enlarged perspective view illustrating an optical sheet of a display device according to another embodiment.
Figure 12:
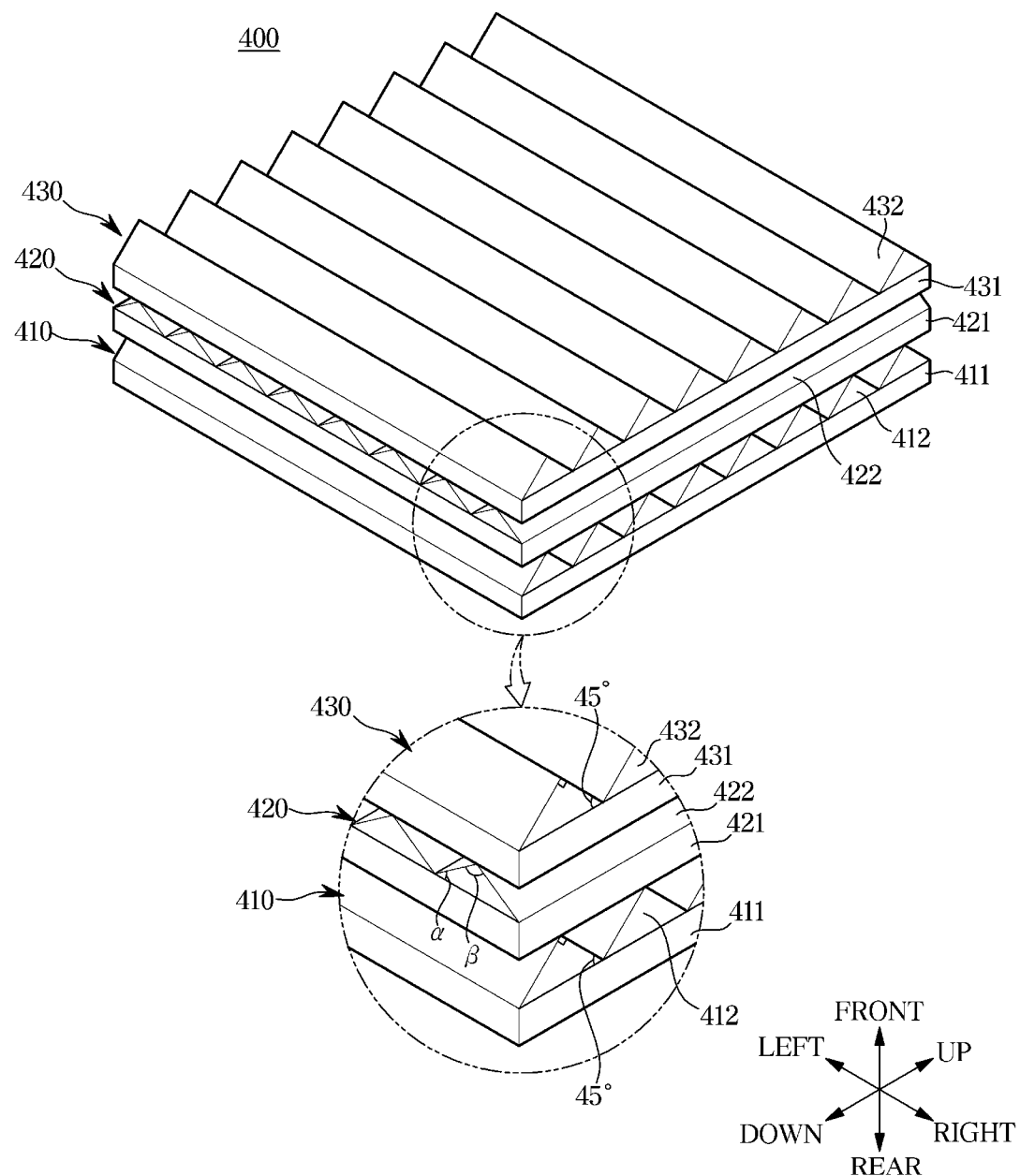
FIG. 12 is an enlarged perspective view illustrating an optical sheet of a display device according to another embodiment.

FIG. 10 is an enlarged perspective view illustrating an optical sheet of a display device according to another embodiment. FIG. 11 is an enlarged perspective view illustrating an optical sheet of a display device according to yet another embodiment. FIG. 12 is an enlarged perspective view illustrating an optical sheet of a display device according to yet another embodiment.

Referring to FIG. 10, an optical sheet 200 may have a first prism sheet 210, a second prism sheet 220, and a third prism 230, similar to the embodiment illustrated in FIG. 3.

The first prism sheet 210 may include a first substrate layer 211 disposed to face the light guide plate 50 while being disposed in front of the light guide plate 50 and a plurality of first prisms 212 formed on a front surface of the first substrate layer 211.

The second prism sheet 220 may include a second substrate layer 221 disposed to face the first prism sheet 210 while being disposed in front of the first prism sheet 210 and a plurality of second prisms 222 formed on a front surface of the second substrate layer 221.

The third prism sheet 230 may include a third substrate layer 231 disposed to face the second prism sheet 220 while being disposed in front of the second prism sheet 220 and a plurality of third prisms 232 formed on a front surface of the third substrate layer 231

Each of the first prism 212 and the second prism 222 may have a cross section in the form of an isosceles triangle. Each of the first prism 212 and the second prism 222 may have a cross section in the form of an isosceles triangle having a base angle of 45 degrees and a vertex angle of 90 degrees. On the other hand, the third prism 232 may have a cross section in the form of an isosceles triangle having a base angle of $\alpha$ degrees and a vertex angle of $\beta$ degrees, According to another embodiment, the first prism 212 may extend in the left side and right side direction. In addition, the plurality of first prisms 212 may be repeatedly arranged in the upper side and lower side direction.

The second prism 212 may extend in the upper side and lower side direction. In addition, the plurality of second prisms 222 may be repeatedly arranged in the left side and right side direction.

The third prism 232 may extend in the left side and right side direction. In addition, the plurality of third prisms 232 may be repeatedly arranged in the upper side and lower side direction.

As described above, the optical sheet 200 may have an arrangement rotated by about 90 degrees, compared to the optical sheet 100 shown in FIG. 3. The arrangement structure of the prism sheets 210, 220, and 230 will be referred to as horizontal vertical horizontal (HVH).

Referring to FIG. 11, an optical sheet 300 according to another embodiment may have a VHV structure similar to that shown in FIG. 3.

According to an embodiment, a first prism sheet 310 and a third prism sheet 330 each may have a cross section in the form of an isosceles triangle. Each of a first prism 312 of the first prism sheet 310 and a third prism 332 of the third prism sheet 330 may have a cross section in the form of an isosceles triangle having a base angle of 45 degrees and a vertex angle of 90 degrees. On the other hand, a second prism 322 of a second prism sheet 320 may have a cross section in the form of an isosceles triangle having a base angle of $\alpha$ degrees and a vertex angle of $\beta$ degrees. In this case, the base angle $\alpha$ may have the following range.

$$30° \le \alpha \le 40°$$

Referring to FIG. 12, an optical sheet 400 according to another embodiment may have an HVH structure similar to that shown in FIG. 10.

According to this embodiment, a first prism sheet 410 and a third prism sheet 430 may have a cross section in the form of an isosceles triangle. A first prism 412 of the first prism sheet 410 and a third prism 432 of the third prism sheet 430 may have a cross section in the form of an isosceles triangle having a base angle of 45 degrees and a vertex angle of 90 degrees. On the other hand, a second prism 422 of a second prism sheet 420 may have a cross section in the form of an isosceles triangle having a base angle of $\alpha$ degrees and a vertex angle of $\beta$ degrees. In this case, the base angle $\alpha$ may have the following range:

$$30° \le \alpha \le 40°$$

Figure 13:
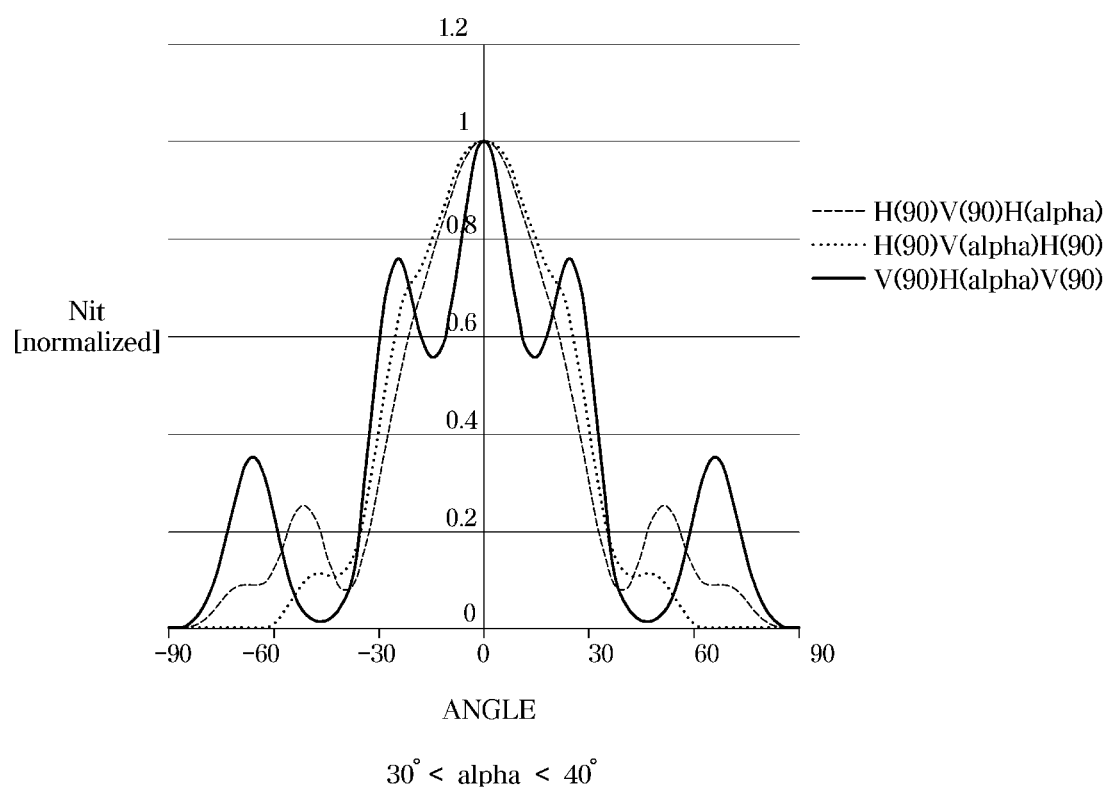
FIG. 13 is a graph showing distribution of light according to a viewing angle in display devices including the respective optical sheets shown in FIGS. 10 to 12 according to an embodiment.

FIG. 13 is a graph showing distribution of light according to a viewing angle in the display devices including the respective optical sheets shown in FIGS. 10, 11 and 12.

Referring to FIG. 13, the light distribution of the backlight units 60 including the optical sheets 200, 300, and 400 shown in FIGS. 10, 11 and 12 may have the following characteristics.

In the case of having the optical sheets 200, 300, and 400 according to the embodiments, the distribution of slightly varies among the optical sheets 200, 300, and 400, but the brightness of the side light generated at a viewing angle of 30 degrees or more may be reduced. By reducing the brightness of the side light, the side light leakage of the display device may be reduced. The side light leakage of the display device may be an obstacle to implementing the full black color. Accordingly, the black color implementation of the display device may be improved by reducing the side light leakage of the display device.

Figure 14:
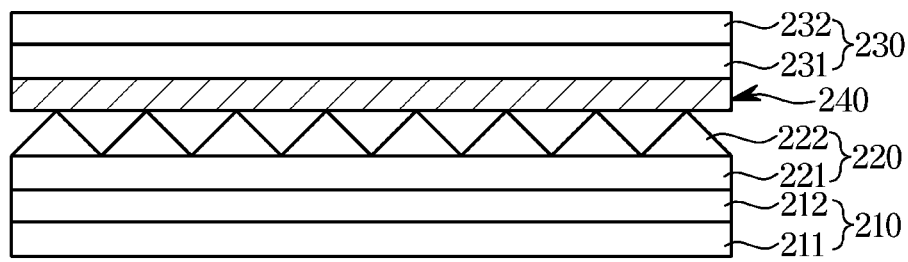
FIG. 14 is a schematic cross-sectional view illustrating an optical sheet of a display device according to another embodiment.

FIG. 14 is a schematic cross-sectional view illustrating an optical sheet of a display device according to another embodiment.

Referring to FIG. 14, an optical sheet 200 may have a HVH structure as shown in FIG. 10. In addition, the optical sheet 200 may include a reflective polarizing sheet 240 disposed between the third prism sheet 230 and the second prism sheet 220.

The reflective polarizing sheet 240 may improve the brightness of the backlight unit 60. The reflective polarizing sheet 240 may be disposed between the second prism sheet 220 and the third prism sheet 230 to improve the brightness of the backlight unit 60.

The reflective polarizing sheet 240 may reflect light irradiated from the backlight unit 60, which is polarized in a direction different from a polarization direction of the reflective polarizing sheet 240. The reflective polarization sheet 240 may have the same polarization direction as that of the reflective sheet 55 disposed behind the reflective polarization sheet 240.

The light reflected by the reflective polarizing sheet 240 may be recycled inside the display device to improve the brightness of the display device. Some of the lights reflected by the reflective polarizing sheet 240 may travel back to the light guide plate 50 or the reflective sheet 55. Further, the light guide plate 50 and the reflective sheet 55 may reflect back the reflected light from the reflective polarizing sheet 240 toward the direction of the reflective polarizing sheet 240. As the process is repeated, the polarization direction of the light may be changed. When the polarization direction of the light is parallel to the polarization direction of the reflective polarizing sheet 240, the light may pass through the reflective polarizing sheet 240.

As described above, the reflective polarizing sheet 240 may be a dual brightness enhancement film (DBEF). The DBEF reflective polarizing sheet 240 may be disposed between the second prism sheet 220 and the third prism sheet 230 to improve the brightness of the backlight unit 60.

Although the reflective polarizing sheet 240 is illustrated as being stacked in front of the second prism sheet 220, and the third prism sheet 230 is illustrated as being stacked in front of the reflective polarizing sheet 240, the embodiments described herein are not limited thereto. The reflective polarizing sheet 240 may be laminated with the second prism sheet 220 and/or the third prism sheet 230. Alternatively, the reflective polarizing sheet 240 may be laminated with the first prism sheet 210, the second prism sheet 220, and the third prism sheet 230.

Furthermore, at least one prism sheet in the lamination may include prisms having different heights. At least one of the first prism sheet 210, the second prism sheet 220, and the third prism sheet 230 may include prisms having different heights. The prisms having different heights may represent a prism having a first height and another prism having a second height different from the first height. The prism having the first height and the another prism having the second height may be alternately arranged along the traverse direction or the longitudinal direction of the display device.

Figure 15:
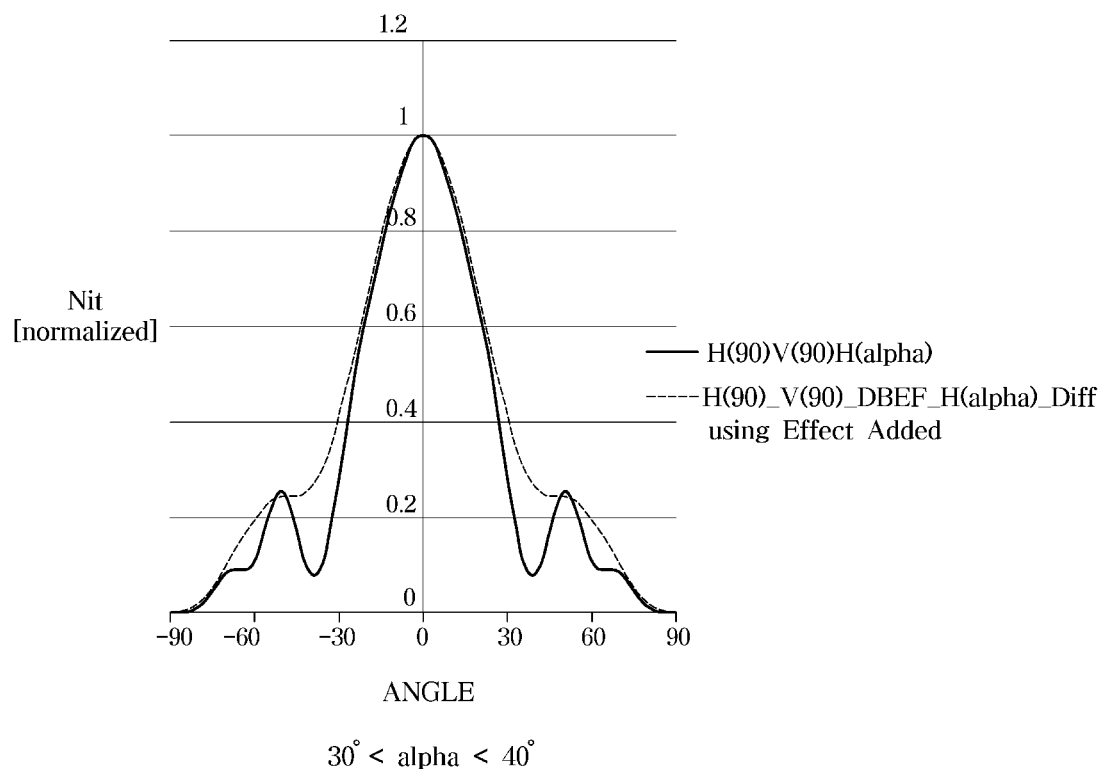
FIG. 15 is a graph showing distribution of light according to a viewing angle in a display device including the optical sheet shown in FIG. 14 according to an embodiment.

FIG. 15 is a graph showing distribution of light according to a viewing angle in the display device including the optical sheet shown in FIG. 14.

Referring to FIG. 15, it may be seen that the diffusions of light slightly vary between a case in which a diffusion effect is provided by at least one of the first, second, and third prism sheets 210, 220, and 230 or by another optical sheet, such as the reflective polarizing sheet 240, and a case in which no diffusion effect is provided.

The brightness of the backlight unit 60 may gradually decrease at a viewing angle of less than about 30 degrees depending on the degree of diffusion of an optical diffusion sheet. Referring to FIG. 15, when no diffusion effect is provided, the viewing angle-specific brightness graph has a section in which the inclination is 0, at a viewing angle of about 45 degrees or less. When no diffusion effect is provided, that is when the reflective polarizing sheet 240 having the diffusion effect is not disposed, the viewing angle-specific brightness graph has a section in which the brightness abruptly decreases and then increases, at a viewing angle of about 45 degrees or less. However, when the reflective polarizing sheet 240 is disposed between the second prism sheet 220 and the third prism sheet 230 as shown in FIG. 14, the viewing angle-specific brightness graph does not have a section in which a sudden change occurs in the brightness.

As such, by including the reflective polarizing sheet 240 in the optical sheet 200, the brightness is prevented from being abruptly lowered at a viewing angle of about 45 degrees or less. When a sudden change in brightness exists by viewing angles, the brightness of an image displayed on the display device may suddenly change depending on the viewing angle of the display device, causing the viewer to feel uncomfortable. According to the embodiments herein, such a rapid change in brightness by the viewing angle may be reduced. Therefore, the display device according to the embodiments may display an image of uniform brightness even when the viewing angle varies.

As described above, the display device may have less side light leakage by improving the structure of the optical sheet.

The above descriptions are only provided for the purpose of describing the embodiments herein. It would be understood by those skilled in the art that changes and modifications may be made in these embodiments without departing from the principles and scope of the disclosure.

What is claimed is:

1. A display device comprising:
a backlight unit configured to emit light;
a display panel disposed in front of the backlight unit; and
an optical sheet disposed between the backlight unit and the display panel,
wherein the optical sheet comprises:
a first prism sheet comprising a plurality of first prisms arranged in a first direction;
a second prism sheet comprising a plurality of second prisms arranged in a second direction intersecting the first direction, and disposed in front of the first prism sheet;
a third prism sheet comprising a plurality of third prisms arranged in the first direction, and disposed in front of the second prism sheet; and
a first reflective polarizing sheet disposed between the second prism sheet and the third prism sheet,
wherein each of the first prisms, the second prisms, and the third prisms has a cross section in a form of an isosceles triangle,
wherein the cross section of each of the first prisms has a base angle of 45 degrees and a vertex angle of 90 degrees,
wherein the cross section of each of the third prisms has a base angle of a degrees and a vertex angle of β degrees, and
wherein the base angle α is in a range of 30 degrees to 40 degrees.

2. The display device of claim 1, wherein the cross section of each of the second prisms has a base angle of a degrees and a vertex angle of (3 degrees.

3. The display device of claim 2, wherein the base angle α is in a range of 30 degrees to 40 degrees.

4. The display device of claim 3, wherein the optical sheet further comprises a second reflective polarizing sheet disposed in front of the third prism sheet.

5. The display device of claim 3, wherein the first direction is parallel to at least one of a traverse direction and a longitudinal direction of the display device.

6. The display device of claim 1, wherein the cross section of each of the second prisms has a base angle of 45 degrees and a vertex angle of 90 degrees.

7. The display device of claim 1, wherein the optical sheet further comprises a second reflective polarizing sheet disposed in front of the third prism sheet.

8. The display device of claim 1, wherein the first direction is parallel to at least one of a traverse direction and a longitudinal direction of the display device.

9. A display device comprising:
a display panel; and
an optical sheet disposed behind the display panel,
wherein the optical sheet comprises:
   a first prism sheet comprising a plurality of first prisms extending in a longitudinal direction of the display panel and arranged in a traverse direction of the display panel;
   a second prism sheet comprising a plurality of second prisms extending in the traverse direction and arranged in the longitudinal direction, and disposed in front of the first prism sheet;
   a third prism sheet comprising a plurality of third prisms extending in the longitudinal direction and arranged in the traverse direction, and disposed in front of the second prism sheet; and
   a reflective polarizing sheet disposed between the second prism sheet and the third prism sheet,
wherein each of the first prisms, the second prisms, and the third prisms has a cross section in a form of an isosceles triangle,
wherein the cross section of each of the first prisms has a base angle of 45 degrees and a vertex angle of 90 degrees,
wherein the cross section of each of the third prisms has a base angle of $\alpha$ degrees and a vertex angle of $\beta$ degrees, and
wherein the base angle $\alpha$ is in a range of 30 degrees to 40 degrees.

10. The display device of claim 9, wherein each of the second prisms has a base angle of 45 degrees and a vertex angle of 90 degrees.

11. A display device comprising:
a display panel; and
an optical sheet disposed behind the display panel,
wherein the optical sheet comprises:
   a first prism sheet comprising a plurality of first prisms extending in a traverse direction of the display panel and arranged in a longitudinal direction of the display panel;
   a second prism sheet comprising a plurality of second prisms extending in the longitudinal direction and arranged in the traverse direction, and disposed in front of the first prism sheet;
   a third prism sheet comprising a plurality of third prisms extending in the traverse direction and arranged in the longitudinal direction, and disposed in front of the second prism sheet; and
   a reflective polarizing sheet disposed between the second prism sheet and the third prism sheet,
wherein each of the first prisms, the second prisms, and the third prisms has a cross section in a form of an isosceles triangle,
wherein the cross section of each of the first prisms has a base angle of 45 degrees and a vertex angle of 90 degrees,
wherein the cross section of each of the third prisms has a base angle of $\alpha$ degrees and a vertex angle of $\beta$ degrees, and
wherein the base angle $\alpha$ is in a range of 30 degrees to 40 degrees.

* * * * *